Patented June 25, 1940

2,205,848

UNITED STATES PATENT OFFICE 2,205,848

MONOAZO DYESTUFFS SOLUBLE IN WATER

Erich Fischer, Bad Soden in Taunus, Germany, assignor to General Aniline & Film Corporation, a corporation of Delaware No Drawing. Application June 21, 1938, Serial No. 214,935. In Germany June 22, 1937

4 Claims. (Cl. 260—198)

The present invention relates to monoazo dyestuffs soluble in water; more particularly it relates to dyestuffs corresponding with the following general formula:

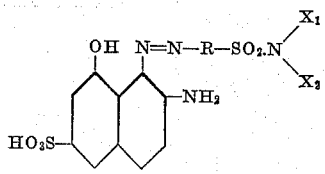

wherein R stands for the radical of a diphenyl ether and $X_1$ and $X_2$ stand for hydrogen, alkyl-, cycloalkyl- or aryl-groups, which may be connected in a heterocyclic ring system.

I have found that valuable red monoazo dyestuffs soluble in water are obtained by coupling, in an acid solution, with 2-amino-8-hydroxy-naphthalene-6-sulfonic acid a diazo compound from an amino-diaryl ether substituted by the radical:

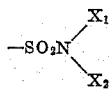

wherein $X_1$ and $X_2$ stand for hydrogen, alkyl-, cyclo-alkyl- or aryl-groups, which may be connected in a heterocyclic ring system.

The new dyestuffs dye wool fast red tints. They are distinguished from the known azo dyestuffs obtainable by coupling diazo-compounds from the group of amino-diaryl ethers with amino-naphthol-sulfonic acids or acylamino-naphthol-sulfonic acids by a better fastness to wet processing, partly also by a better fastness to light.

The following examples serve to illustrate the invention, but they are not intended to limit it thereto; the parts are by weight:

(1) A solution of 239 parts of 2-amino-8-hydroxynaphthalene-6-sulfonic acid is acidified and then run while stirring into a diazo-solution obtained from 368 parts of 4-amino-diphenyl ether-2-sulfo-N-ethyl-anilide. The whole is further stirred for some hours and worked up, after complete coupling, in the usual manner. The dyestuff is a red powder which dyes wool fast red tints. It corresponds with the following formula:

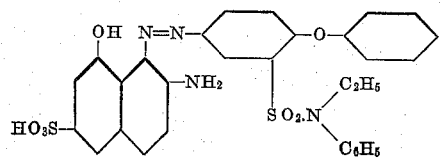

(2) A solution of 354 parts of 4-aminodiphenyl ether-2-sulfo-N-methylanilide in 400 parts of glacial acetic acid is run, while stirring, into 300 parts of hydrochloric acid and 300 parts of ice, a concentrated aqueous solution of 69 parts of sodium nitrite being simultaneously caused to run in. The clear diazo-solution is made up with water to about 5 liters. An aqueous solution obtained from 239 parts of 2-amino-8-hydroxynaphthalene-6-sulfonic acid and having an acid reaction towards litmus paper is then caused to run in, at about 15° C., while vigorously stirring. Stirring is continued, for one hour, at a temperature of 30° C. and the whole is filtered with suction. By means of sodium carbonate, the dyestuff is transformed into the sodium salt. After drying, it is a red powder soluble in water which dyes wool fast red tints.

(3) 344.5 parts of 4-amino-4'-chlorodiphenyl ether-2-sulfodiethyl amide are dissolved in water and 300 parts of hydrochloric acid and diazotized by means of 69 parts of sodium nitrite. An aqueous solution obtained from 239 parts of 2-amino-8-hydroxynaphthalene-6-sulfonic acid and having an acid reaction towards litmus paper is caused to run into the diazo-solution thus obtained, at a temperature of 10° C.–15° C. Stirring is continued, for about one hour, at 30° C., and the reaction product is worked up as usual. The dyestuff is a red powder having properties similar to those of the dyestuff described in Example 1.

If the amino-diaryl ethers used in the preceding examples are, for instance, exchanged for one of the following compounds:

2-aminodiphenyl ether-4-sulfo-diethylamide,
4-aminodiphenyl ether-2-sulfo-anilide,
4-aminodiphenyl ether-2-sulfo-ortho-toluidide,
4-aminodiphenyl ether-2-sulfo-N-ethyl-para-chloranilide,
2-amino-4'-chlorodiphenyl ether-4-sulfo-dimethylamide,
4-aminodiphenyl ether-2-sulfo-piperidide,
4-aminodiphenyl ether-2-sulfo-diphenylamide,
4-aminodiphenyl ether-2-sulfo-n-butylamide,
4-aminodiphenyl ether-2-sulfo-cyclohexylamide,
4-amino-4'-methoxy-diphenyl ether-2-sulfamide,
4-amino-4'-methyldiphenyl ether-2-sulfo-N-methyl-ortho-toluidide,
2-aminodiphenyl ether-4'-sulfo-diethylamide,
4-aminodiphenyl ether-3'-sulfo-N-methylanilide,
4-aminodiphenyl ether-4'-sulfo-dimethylamide,
2-aminodiphenyl ether-3'-sulfo-ethylamide, dyestuffs having similar properties are obtained.

I claim:
1. The water-soluble monoazo dyestuffs of the following general formula:

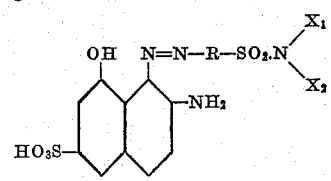

wherein R stands for the radical of a diphenyl ether and $X_1$ and $X_2$ stand for members of the group consisting of hydrogen, alkyl, cycloalkyl and radicals of the benzene series, which may be connected in a piperidine ring, being red powders which dye wool fast red tints.

2. The water-soluble monoazo dyestuff of the following formula:

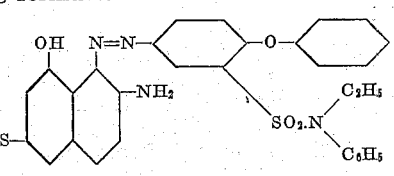

being a red powder which dyes wool fast red tints.

3. The water-soluble monoazo dyestuff of the following formula:

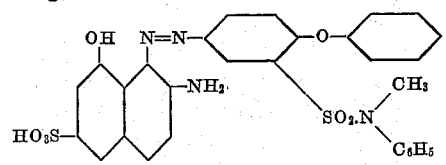

being a red powder which dyes wool fast red tints.

4. The water-soluble monoazo dyestuff of the following formula:

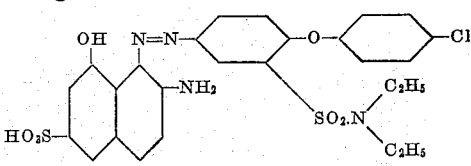

being a red powder which dyes wool fast red tints.

ERICH FISCHER.